April 11, 1961

R. A. ENGLERT

2,979,228

LEAD WIRE FEED

Filed May 16, 1957

INVENTOR

RALPH A. ENGLERT

BY *Michael Hertz*

ATTORNEY

April 11, 1961 R. A. ENGLERT 2,979,228
LEAD WIRE FEED
Filed May 16, 1957 10 Sheets-Sheet 3

INVENTOR
RALPH A. ENGLERT
BY Michael Hertz
ATTORNEY

INVENTOR
RALPH A. ENGLERT
BY Michael Hertz
ATTORNEY

April 11, 1961 R. A. ENGLERT 2,979,228
LEAD WIRE FEED
Filed May 16, 1957 10 Sheets-Sheet 5

FIG-5

INVENTOR
RALPH A. ENGLERT
BY Michael Hertz,
ATTORNEY

April 11, 1961    R. A. ENGLERT    2,979,228
LEAD WIRE FEED
Filed May 16, 1957    10 Sheets-Sheet 6

INVENTOR
RALPH A. ENGLERT
BY *Michael Hertz*,
ATTORNEY

April 11, 1961 R. A. ENGLERT 2,979,228
LEAD WIRE FEED
Filed May 16, 1957 10 Sheets-Sheet 7

FIG-9

INVENTOR
RALPH A. ENGLERT
BY Michael Hertz
ATTORNEY

United States Patent Office 2,979,228
Patented Apr. 11, 1961

2,979,228
LEAD WIRE FEED

Ralph A. Englert, Jersey Shore, Pa., assignor, by mesne assignments, to Sylvania Electric Products Inc., Wilmington, Del., a corporation of Delaware Filed May 16, 1957, Ser. No. 659,725

16 Claims. (Cl. 221—9)

This invention relates to mechanism for feeding lead-in wires one by one into a temporary carrier for subsequent transfer to a stem molding machine.

In the manufacture of electron tubes machines have been provided which feed lead-in wires from one or more bunches of wires simultaneously into ducts and thence via the ducts into apertures in pegs arranged circumferentially of a turret for subsequent sealing in of the wires to a glass base. Where for some reason one or more of the wires fail to enter a duct or fail to move through the duct into an aperture in the peg, there is a resultant failure to produce a proper molded stem or whole series of stems before the faulty operation of the machine is noted or the machine is stopped. Moreover a considerable delay in the operation of the machine may result while the difficulty is rectified.

It is an object of the invention to provide a mechanism which will load a transfer device or temporary carrier with the proper number of lead-in wires, which transfer carrier will then supply each of the pegs of the stem molding machine with an appropriate number of lead-in wires.

It is a further object of the invention to provide means to load the carrier with lead-in wires, one by one, from independent loaders freely detachably mounted on the machine, whereby a defective loader may be easily replaced by another loader.

It is a still further object of the invention to provide a number of loaders along a path of travel traversed by the carriers in excess of the number of wires required for a molded stem in order that one of these may be quickly put into operation to replace a loader which for one reason or another may have become defective in operation.

It is yet another object of the invention to provide a checking head to check the number of leads in the carriers and add a lead to a carrier should one be missing.

Other objects will become apparent upon perusal of the following detailed specification and claims when taken in consideration with the accompanying drawing in which Figs. 1A and 1B together constitute a plan view of the machine together with a portion of a stem molding machine.

Figure 12:
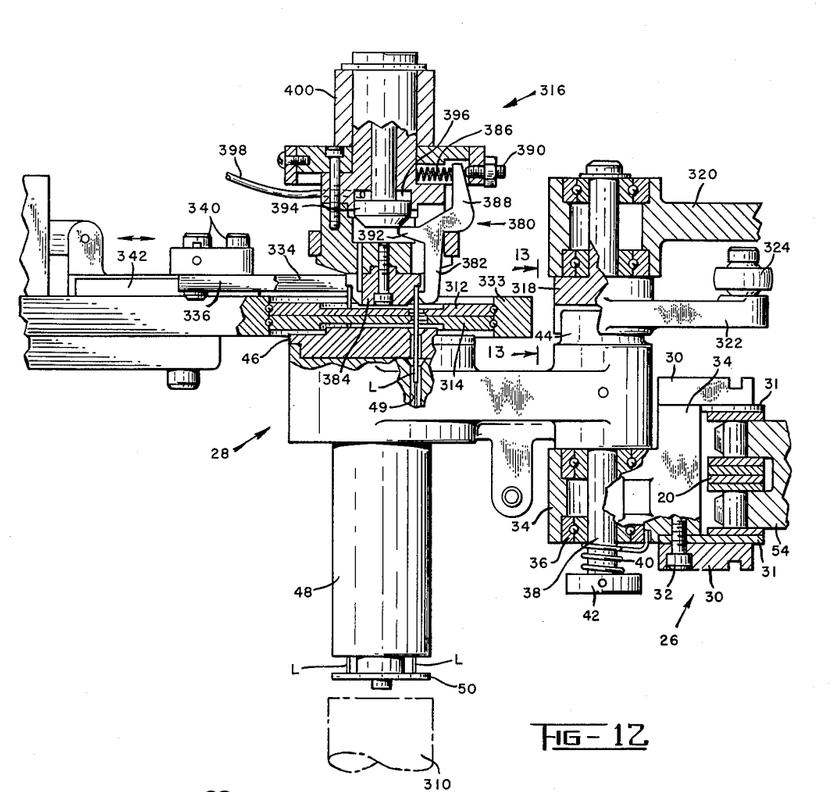
Fig. 12 is an enlarged detailed view of a chain conveyor, alignment discs and wire inserting head, in cooperation.
Figure 13:
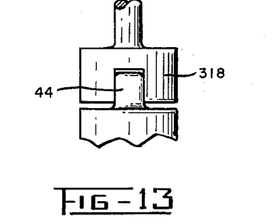
Fig. 13 is a view of a key and pivot arrangement for rotating a carrier with respect to the chain, taken along line 13—13 of Fig. 12.
Figure 14:
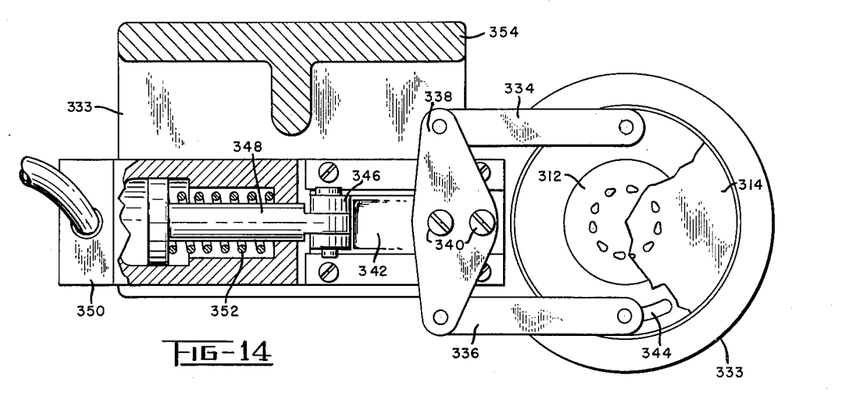
Fig. 14 is a plan view of the alignment discs shown in Fig. 12.
Figure 15:
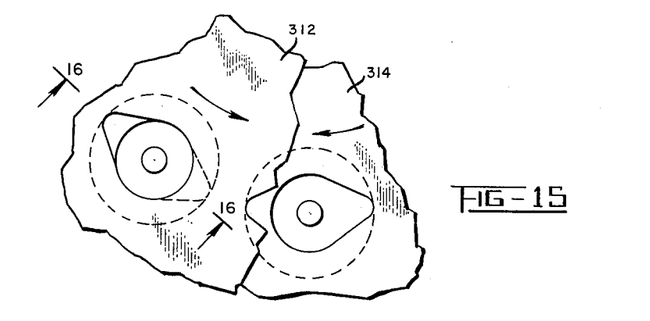
Fig. 15 is a fragmentary enlargement of the alignment discs showing the apertures in greater detail.

Now referring to the drawings in greater detail, and with particular reference to Figs. 1A and 1B and Figs. 2A and 2B, 3 and 12, at 10 there is disclosed a frame supported by legs 12. This frame is of inverted U form and serves as the support for an inverted T shaped member 14 running centrally and longitudinally of the frame. Fastened to the horizontal webs of the T shaped member is a pair of sleepers 16 and to them is fastened a pair of vertical plates or rails 18 forming the lower tracks for an endless chain 20 with runs on each side of the vertical portion of member 14. Cooperating sleepers 22 and upper plates or rails 24 for the chain are fastened to the upper end of member 14. Fastened rigidly to the chain, at spaced intervals therealong are arms 26 each of which pivotally supports a wire-lead carrier 28. The arms 26, see Fig. 12, have grooved cheeks 30 and intermediate plates 31 securely fastened by cap screws 32 to a bored bearing block 34 in which are roller bearings 36 rotatably supporting the vertical shaft 38 of the carrier 28. A spring 40 reacting between a portion of bearing block 34 and a disc 42 fast on the shaft 38 tends to maintain the carrier 28 so that it is parallel with the runs of the chain as shown for example in Figs. 1A and 1B. Each carrier 28 is adapted to be swung to a position substantially at right angles to the chain as shown in Fig. 12 against the action of spring 40 by means of a key 44, forming part of the upper end of the shaft 38, and mechanism cooperating therewith, as will be explained later on.

At the free end of each carrier 28 is a perforated lead carrier plate 46, the same being seated in the carrier and suitably fastened therein. This plate has a circular array of holes therethrough corresponding in position to the arrangement of leads in the base of an electron tube. Each carrier 28 has dependent therefrom a cylinder 48 which has bores 49 therethrough registering with the holes through the plate. For facilitating viewing leads L which may be inserted into the plate and cylinder, the lower end of the cylinder is spooled leaving a lower spool flange 50 against which the lower end of a lead may butt.

Figure 1A:
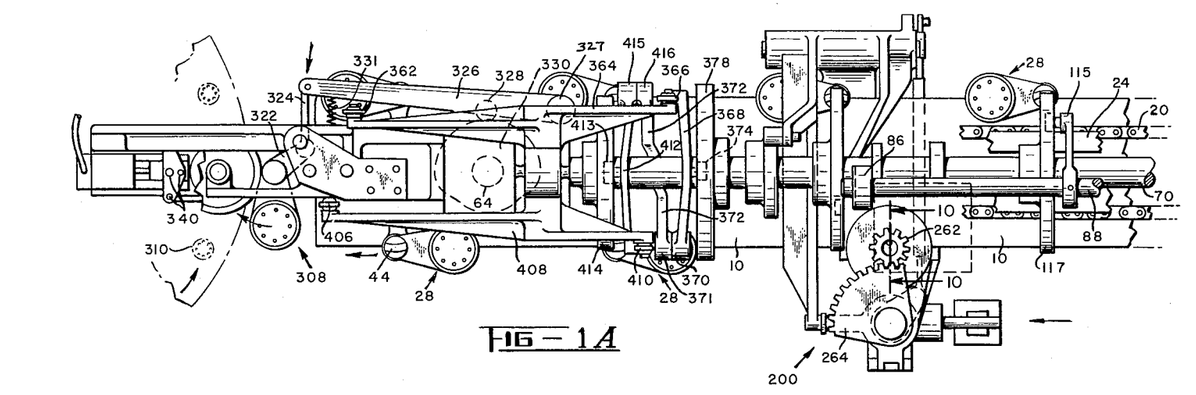
Figure 1B:
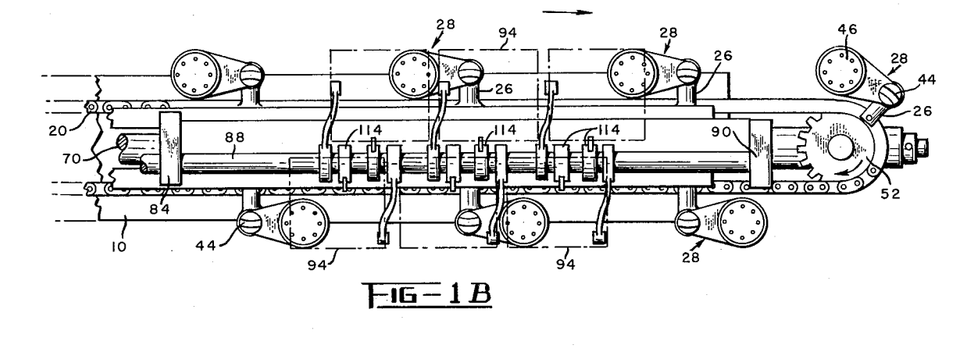
Figure 2A:
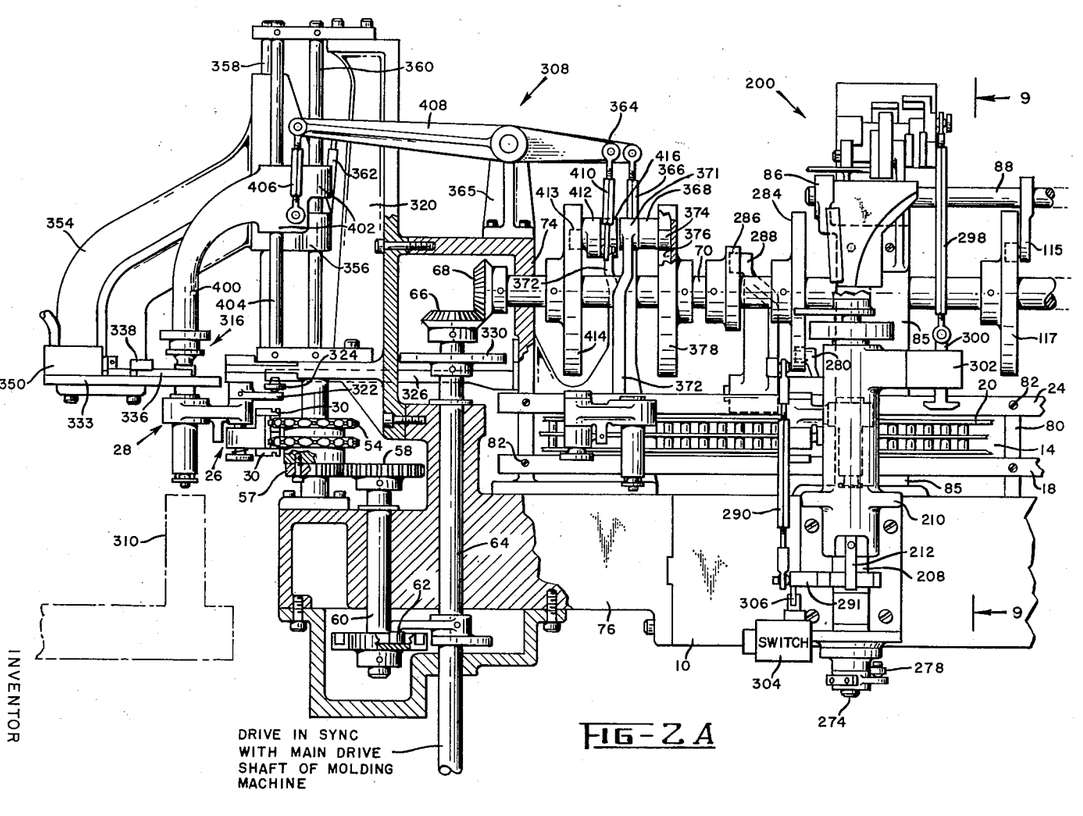
Figs. 2A and 2B together constitute a side elevation of the machine, parts being shown in section to disclose hidden parts.
Figure 2B:
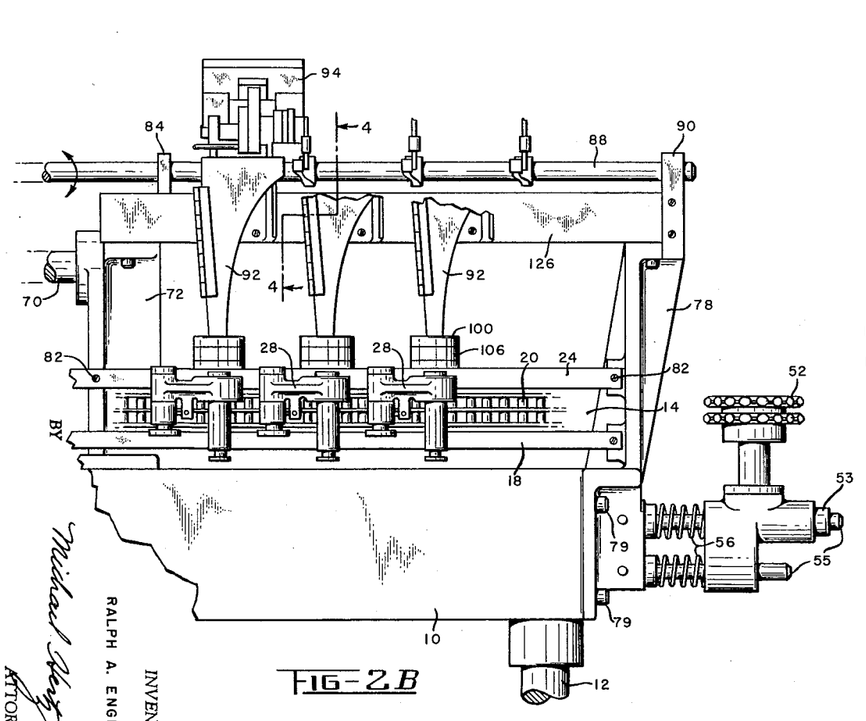

The chain 20, see Figs. 1B, 2A and 2B, is trained about an idler sprocket 52 and a driven sprocket 54. The idler sprocket is urged by conventional spring arrangement consisting of guide rods 55 and springs 56 to tension the chain. A stop 53 is provided on at least one of the rods 55 to limit the outward position of the idler sprocket. The driven sprocket 54 has fastened thereto a gear 57 meshing with a driving gear 58 at the upper end of a shaft 60 which is driven by conventional Geneva gear mechanism as indicated at 62 from a main drive shaft 64 which is geared for movement in synchronism with the main drive shaft of a stem molding machine with which the lead-in feeder is associated.

Atop the main drive shaft 64 is a bevel gear 66 meshing with a second bevel gear 68 fixed to a main horizontal drive shaft 70 running longitudinally of the frame and supported at one end, see Fig. 2B, by an intermediate standard 72 mounted on the frame 10 and at the left hand forward end, see Fig. 2A, by a forward standard 74, mounted on an extension 76 on the frame 10. A third or rear standard 78, see Fig. 2B, is also mounted on the frame by means of screws 79. The rails 18 and 24 are suitably fastened to these standards and to intermediate risers 80 by suitable means, such as screws 82. Above the intermediate standard 72 there is a bearing ear 84 and close to the forward end of the frame, see Fig. 1A, is another standard 85 carrying forward bearing ear 86. A rocker shaft 88 is mounted for oscillation in bearings in the ears 86 and 84 and in a bearing in an ear 90 offset from the standard 78.

Figure 3:
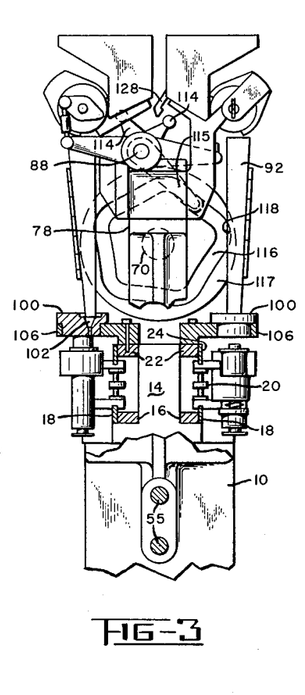
Fig. 3 is a rear end view of the machine, parts being shown in section and others dotted to better disclose the structure.
Figure 4:
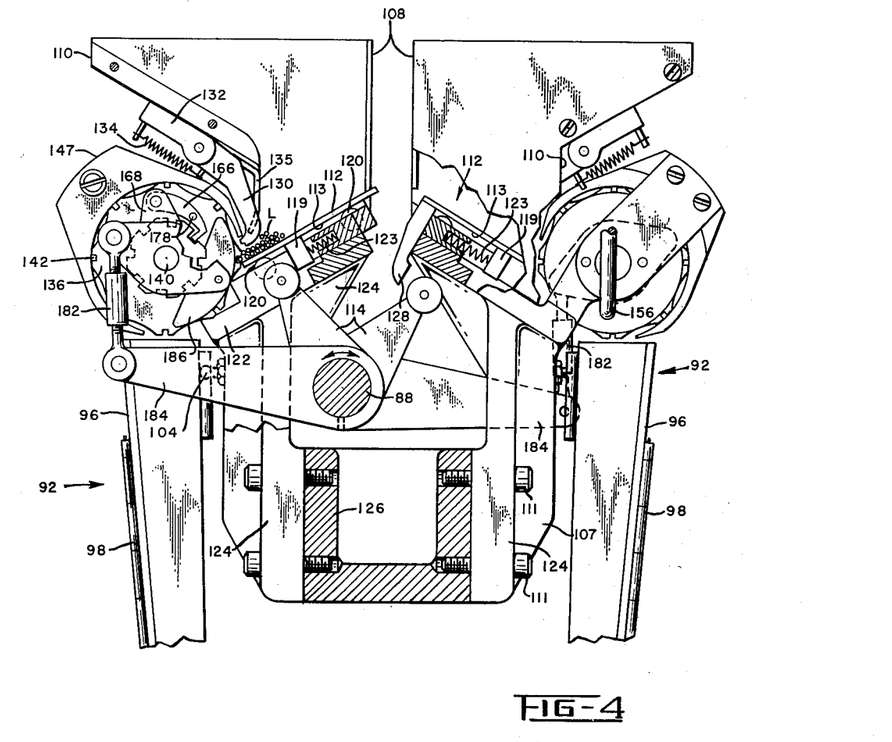
Fig. 4 is a part sectional view taken along line 4—4 of Fig. 2B of lead feed mechanism showing how leads are transferred from a hopper to a chute.
Figure 5:
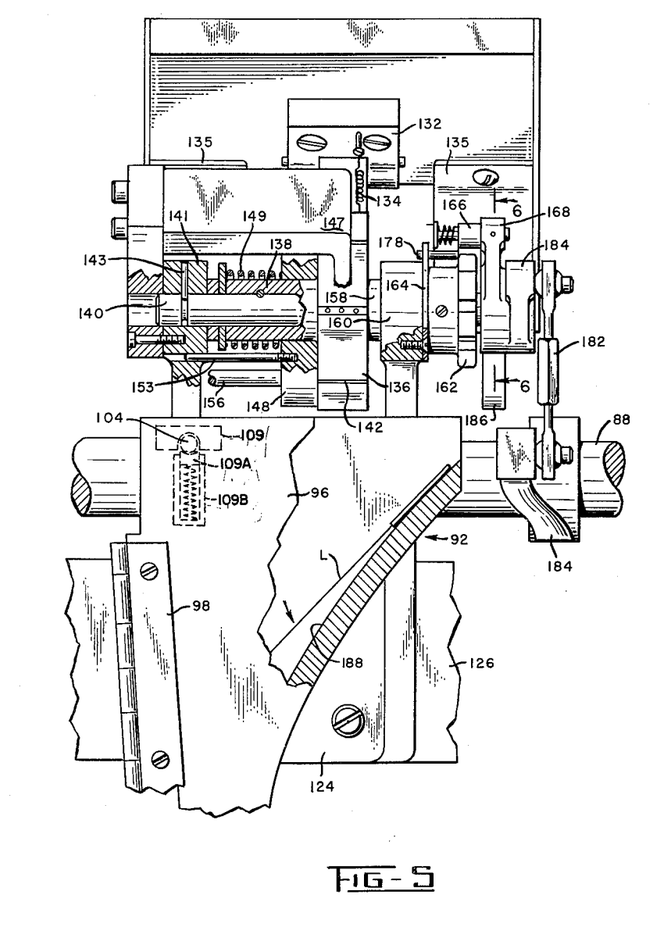
Fig. 5 is an elevational view of the same feed mechanism as viewed from the left of Fig. 4, partly in section.

At spaced points along both runs of the chain and toward the rear or right hand end of the machine, Fig. 2B, are a number of feeding chutes 92 to conduct lead wires from hoppers 94 above the chutes down into appropriate carriers 28, there being at least as many pairs of chutes and hoppers as there are lead wires to be received by the carrier and preferably at least an additional one for emergency use. Each of the chutes, see Figs. 4 and 5, is provided with a door 96 held to the chute by a piano hinge 98 or the like with conventional spring arrangement to keep the chute door closed. The chute, it will be noted, has a wider upper mouth and tapers to a narrow restricted area at the lower end, the lower end resting with some slight freedom of motion in a rotatable chute mouth piece 100, see Figs. 2B and 3, provided with a vertical passageway 102 therethrough eccentric of the axis of rotation of the mouth piece and registering with the exit end of the chute. The chute itself is freely detachably mounted at the free upper end by a ball joint 104, the ball of the ball joint being mounted on a web portion 107 of a bracket 124 which itself is attached by screws 111 to a U-shaped bridge piece 126 supported by the standards 72 and 78. The ball of ball joint 104, see Fig. 5, is retained between a block 109 located on the back upper corner of the chute, and a spring pressed block 109A beneath the ball, the block 109A being slidable in a pocket 109B mounted on the chute beneath the block 109. The bearing 84 previously referred to, is mounted rigidly atop the bridge piece 126. The mouthpieces at the bottom of the chutes, see Fig. 2B and Fig. 3, are rotatably adjustable in holders 106 so as to position the passageway over any selected opening in the plate 46. The mouthpieces are held in adjustment in any convenient fashion as by set screws, not shown, and are arranged so that successive mouthpieces deliver lead-in wires to selected holes in the plate 46, as required by the tube structure. Where no lead wire is required, no wires would be placed in the corresponding hopper and therefore no wire would be fed into the chute. In the event of failure of the machine to operate properly at any particular hopper-chute station, an additional hopper-chute combination would be manually impressed into service by properly orientating its mouthpiece. Each chute is fed with lead wires in timed relation with intermittent movement of the chain. As shown in Figs. 4 and 5, each hopper comprises a boxlike affair with open top, a rear straight wall 108, an opposing second wall 110 with vertically offset portions joined by an inclined portion and an open sloping bottom 112 closed off by a reciprocating slide 113. The lead wires are piled horizontally side by side in the hopper and tend to fall by gravity toward the lower end of the reciprocating bottom slide 113, which by its reciprocation assists such action. The slide is reciprocated by reason of oscillation of shaft 88 which carries a number of thrust arms 114, see Figs. 3 and 4, set in pairs along the length of the shaft for association with pairs of hoppers on opposite runs of the chain. The shaft is oscillated by means of a drive arm 115 on whose end there is a follower riding in a cam track 116 in a cam disc 117 secured to the drive shaft 70. The cam track has five lobes to impart five back and forth oscillations to the shaft 88 for each rotation of shaft 70, one lobe 118 extending much nearer the periphery of the disc than the other to impart wider amplitude of oscillation to the shaft 88 than the other lobes. Each slide 113, on the left hand as viewed in Fig. 4, has an operating lug 119 integral therewith which when engaged by an arm 114, in the clockwise rotation of shaft 88, will shift the slide upwardly of the hopper a very short distance, the slide riding on ball bearings 120 supported in an inclined arm 122 of the webbed bracket 124. Reacting between the inclined arm 122 and the lug 119 is a spring 123 tending to return the slide 113 to its lower position. The slides for the hoppers on the right hand side are similar to the just described slides except that a rear downwardly extending finger 128 is operated by an arm 114 instead of the lug 119 as on the slide of the companion hopper, this construction being necessitated by the off center position of shaft 88.

Figure 6:
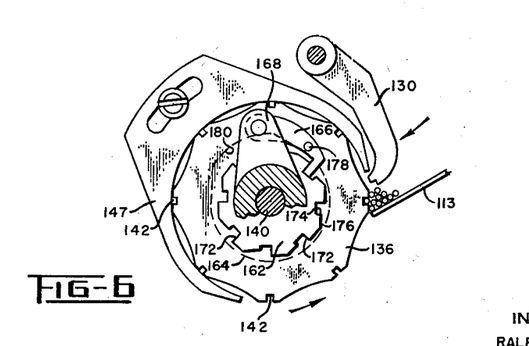
Fig. 6 is a section on the line 6—6 of Fig. 5.
Figure 7:
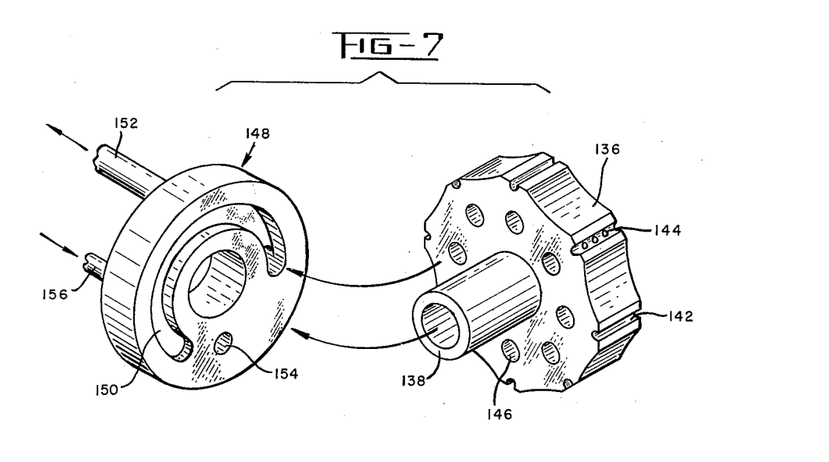
Fig. 7 is an exploded view of portions of the feed mechanism.
Figure 8:
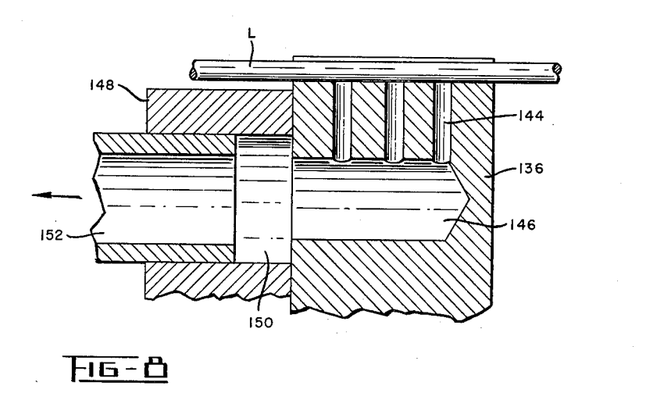
Fig. 8 is an enlarged sectional view through a portion of the assembled feed mechanism.

To further assist in directing the lead wires in the hoppers to a transfer wheel, there is provided a finger 130 pivoted to a U-shaped frame 132 on the inclined wall of the hopper and a spring 134, reacting between the U-shaped frame and the finger, tends to rotate the finger clockwise as viewed in Fig. 4, left hand hopper. At the sides of the wall 110 there is provided a pair of angled plates 135 strengthening this section of the hopper. The periphery of a wheel 136 is brought close to the point where the lead wires are dispensed from the hopper and penetrates into the hopper. The periphery of the wheel is undulated and, as the wheel is oscillated and rotated, the wires in the hopper will be jiggled. The wheel is provided with a hollow hub 138, see Figs. 5 and 7, which is fixedly mounted on a countershaft 140 which is rotatably mounted in bearing 141 and 160 extending upwardly from the bracket 124. The shaft 140 is retained against lateral displacement by a conventional arrangement such as a pin 143 in the bearing and a groove in the shaft. The wheel 136 is further provided with slots 142 between undulations, these slots being ported as at 144, all the ports of one slot leading to a manifold 146 opening into a side face of the transfer wheel. To assist in retaining lead wires within slots of the wheel there is provided, see Figs. 4, 5 and 6, an arcuate guide 147 supported by the bearing 141. Mounted on the hub of the wheel and cooperating with the manifolds therein as a valve 148 slidably urged toward the wheel 136 by a spring 149, the valve having an arcuate port 150 extending about 270° on the face opposite the open ends of the manifolds and connected with a source of air under reduced pressure as by a conduit 152. The valve member is prevented from rotating by means of a pin 153 fastened to the member and longitudinally slidable in bearing 141. A small circular port 154 is also provided on the valve member on the same radius as arcuate port 150 and is connected via conduit 156 to a source of air under pressure. A spacer washer 158 is interposed between the second bearing 160 and the transfer wheel. Fast on the portion of the shaft 140 which protrudes through the second bearing is a ratchet wheel 162. Fixedly mounted on the bearing 160 is a cam plate 164. The ratchet wheel and with it the transfer wheel 136 are oscillated back and forth by a pawl 166, spring pressed toward the ratchet teeth, mounted on an oscillatory arm 168 rotatable about the stub shaft 140 and retained against lateral displacement by any conventional means. The ratchet 162, it will be noted by considering Fig. 6, has teeth with walls 172 which are high and opposite walls 174 which are not so high with a ramp portion 176 between the high and low portions. The pawl 166 has a pin 178 which rides on the cam 164 which is generally concentric with the axis of ratchet 162 but which has a high rise portion at 180. The arm 168 is oscillated from shaft 88 by means of toggle link 182 and arm 184 fast in the shaft 88. The arm 168 also has pivotally attached thereto at the end adjacent the hopper an arcuately surfaced plate 186 engaging the lead wires in the hopper to assist in agitating the same as the wheel is oscillated. During the excursions of small amplitude performed by shaft 88, the arm 168 will be oscillated through an angle such that the pin 178 on the pawl 166 will ride on the lower portion of the cam plate 164. As a result, the pawl will not be withdrawn from the teeth on the ratchet wheel 162 and the wheel as well as the transfer wheel will be merely oscillated. During these oscillations, the scalloped formation on the transfer wheel will agitate the lead wires so as to eventually allow the slot 142 in the wheel to be filled with one lead wire which lead wire will be held to the wheel by the suction through the manifolds 146. When the shaft 88 makes its large excursion, the pin 178 will ride up on the high point of the cam plate and the pawl will be disengaged from the ratchet wheel. At this time the wheel will have been advanced far enough so that the bottom-most manifold 146 in the wheel will be opposite the pressure port 154 and the lead wire will be blown down into the chute. The chute is so placed relative to the transfer wheel that one end of the lead wire will strike an inclined wall 188 of the chute arresting its dropping motion while the other end of the lead wire falls freely down inside of a straight vertical wall of the chute. In this manner the lead wires are caused to pass down through the chute in orientated fashion, the orientation depending on how they were originally piled in the hoppers. On the clockwise stroke of the pawl 166, Fig. 6, the tooth of the pawl, as the pawl moves forward, will come to rest on the ramp portion 176 of a tooth on the wheel 162 before the pin 178 sinks low enough down the slope of the high lobe 180 of the cam. Through a continued clockwise motion of the pawl its tooth will fall in behind the high wall 172 of the wheel tooth next to the one it left. Succeeding oscillations of shaft 88 will again cause jiggling action and then advance of the transfer wheel. The lead wires will be maintained by suction against the transfer wheel from the time of pick up until the lead wires are over the chute, by reason of the long arcuate port 150. When a lead wire does come over a chute, a blast of air through pressure port 154 and the aligned manifold 146 will blow the wire away from the wheel and down the chute.

After passing through the chute, the wire will drop into one or another of the holes in the carrier 28 depending upon the predetermined orientation of the mouthpiece 100, the chute having swung on its pivot 104 as needed to accommodate mouthpiece rotation. The timing of parts is such that after a wire has dropped into the carrier, the Geneva movement advances the chain one step to place another carrier beneath the same chute and bring the same carrier beneath the next chute, if there be one at that station.

Figure 9:
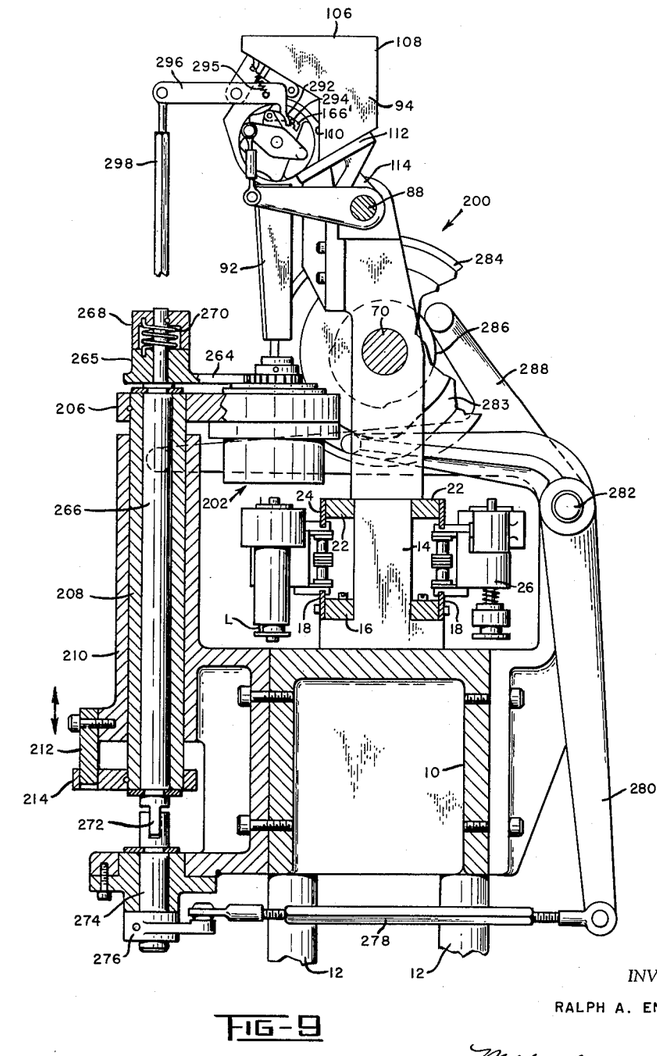
Fig. 9 is a view taken along line 9—9 of Fig. 2A.

The chain travels in the direction of the arrows shown in Figs. 1a and 1b and eventually the carriers will come successively beneath a lead wire checker device indicated as a whole as 200 in Figs. 1A and 2A. The checker is also illustrated in Figs. 9, 10 and 11.

In general, the wire checker comprises a vertically reciprocatable head having a number of checking fingers to determine the absence of a lead wire, a means to rotate a wire feeding chute as determined by the checking fingers so that its mouth is brought to a stop over the carrier hole without a wire therein, and a means to feed a lead from a hopper to the chute, in the case of a missing wire, after the rotation of the chute has ceased.

Figure 10:
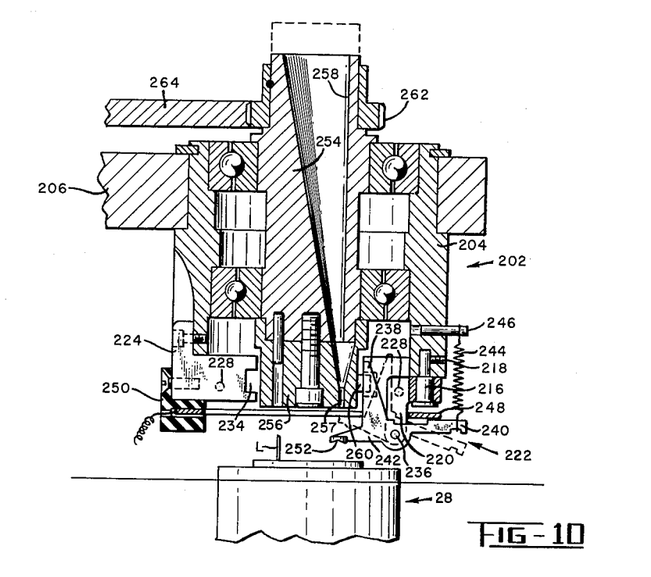
Fig. 10 is a section taken along line 10—10 of Fig. 1A showing the checking head.

As shown in Fig. 10, a carrier 28, assumed to have been filled with leads L in all holes but one, is brought to rest beneath checker head 202. The checker head comprises a sleeve 204 fixedly carried by an arm 206 which extends laterally inward toward the conveyor, see Fig. 9, from a long sleeve 208, vertically reciprocatable in a bearing 210 fastened to the frame 10. For the purpose of preventing rotation of the arm 206 and the sleeve 208, the lower end of the bearing 210 is provided with a key 212 riding in a key slot 214 which is fastened to the sleeve 208. The lower end of the housing 204, Fig. 10, is provided with a circular array of vertical stepped pivot pins 216 held against displacement by set screws 218, there being as many pivot pins as there are bores 49 in the carriers. Mounted for oscillation on each of these pins is an L shaped checker carrier 220 and pivotally supported on each carrier is a three armed checker 222.

Figure 11:
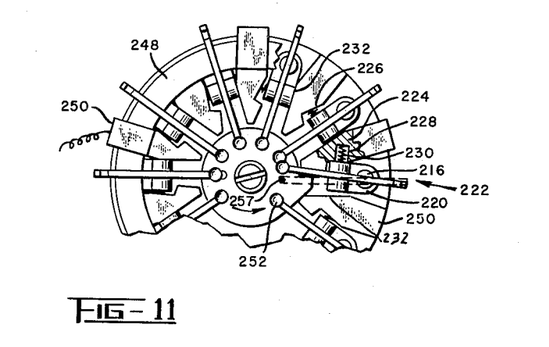
Fig. 11 is a bottom view of Fig. 10.

Fastened in recesses in the outer wall of the sleeve 204, see Figs. 10 and 11, and intercalated with the checkers 222 are L shaped blocks 224 whose horizontal arms are generally radially directed toward the center of the sleeve but which have vertical faces 226 which are at a slight angle to the generally radial face. Each block 224 has a bore 228 perpendicular to the face 226 and housing a coil spring 230 under compression. The spring engages a face of the carrier 220 and urges the carrier about its pivot 216 so that the opposite face engages a beveled face 232 on the adjacent block 224. The inwardly directed end of each block has a runway 234 recessed therein. Each checker is mounted to oscillate on a horizontal axle 236 at the bottom of the carrier 220 and has a stop arm 238, a spring and contact engaging arm 240 and a lead wire sensing finger 242. Springs 244 are stretched between arms 240 and pins 246 projecting radially from the sleeve 204, maintaining the arms 240 in contact with the underface of a flat metallic conductor ring 248 held in place within slots in L shaped insulators 250 fastened to the blocks 224. The checker itself is grounded to the machine frame via the horizontal pivot 236 and spring 244. The checker finger 242 has an inverted cone shaped forward end 252 adapted to help locate a wire projecting up from the carrier 28 should it be slightly off center. As the head 202 moves down to the carrier, the end 252 will engage a wire, causing the arm 240 to move away from contact ring 248. At the same time arm 238 will move from a vertical position where it blocks the runway 234 to an unblocking position as illustrated in the dotted line position of checker 222. The ring 248 is in series with an electromagnet and switch, to be described, and a supply line.

Oscillatable about a vertical axis and mounted by means of bearings in the sleeve 204 is a chute 254 having attached thereto a block 256, as by a screw, and provided with a port 257. The chute has a tapering conical opening 258. Projecting laterally from the block is a wing 260 which during the oscillation of the chute rides through the runways 234 when they are unblocked by the stop arms 238. Such would be the case when the head 202 is lowered and every one of the fingers 242 is engaged with a wire. However should a wire be absent, the wing 260 would engage the arm 238, swing the checker about its pivot 216 against the action of spring 230 and then stop. At this time, see Fig. 11, the end 252 of the checker finger would have been shifted to a position away from underneath the port 257 allowing a wire when fed into the cone 258 to drop into the bore 49 in the carrier, which bore because of proper orientation of the sleeve 204 is aligned with the port 257.

Means for oscillating the chute 254, see Fig. 1A, comprises a gear 262 secured to the upper end of the chute and a gear rack 264 meshing with the gear, the rack, see Fig. 9, having a hub 265 freely rotatable on a reduced end of a vertical oscillatable shaft 266, this shaft being rotatable within the long sleeve 208 and fixedly carrying at its upper end a cap 268. Housed within the cap and drivingly interconnecting the cap and hub is a spring 270 which is materially stronger than any of springs 230. However, whenever the wing 260 strikes a stop arm, continued rotation of shaft 266 will merely result in tensioning of the spring 270 without gear rack movement. The shaft 266 is oscillated through the intermediary of a sliding connection at 272, by a stub shaft 274 mounted in a bearing block secured to the frame, an arm 276 fixed to the stub shaft, a toggle link 278 connected to the arm, a lever 280 pivoted at 282 on the frame and a way 283 in a cam disc 284 fixed on the main shaft 70 and in which way rides a follower on the lever. The lever 280 will make a complete back and forth oscillation on each chain stepping or indexing movement. A second cam 286 operates on the short arm of a bell crank lever 288 whose long arm is suitably connected to a vertical link 290, see Fig. 2A, in turn connected to an extension 291 extending from the lower end of the sleeve 268, all to vertically shift shaft 266.

The wire feed mechanism for the hopper at the checker station is like the mechanism for the other hoppers except that means are provided to prevent effective feeding action of the ratchet advancing pawl 166 when there are no missing leads in the carrier beneath the checker hopper. In the case of the checker pawl 166', see Fig. 9, the operation thereof is under control of a release finger 292 which normally is in engagement with a pin 294 on the pawl and holds the pawl elevated, a spring 295 assisting in this operation. The finger is on the end of a lever 296 connected by a link 298, see Fig. 2A, with the core 300 of an electromagnet coil 302, this coil being the coil of the electromagnet which is in series with the ring 248 in the checker. A switch 304 is also in series with the electromagnet and ring 248. The circuit to the electromagnet is completed only when one of the leads is missing and a checker 222 has not been moved out of contact with the ring 248 and when the switch 304 is closed.

When a lead wire is missing, a circuit through the ring 248 and electromagnet will be established after depression of the checker head and engagement of extension 291 with a roller 306 on the upper end of the plunger of the switch 304. Closure of switch 304 energizes the magnet, moving the lever end 292 downwardly and allowing the pawl 166' to engage the ratchet wheel 162. Now oscillation of the pawl 166' will effect normal jiggling and advance movement of the ratchet wheel to feed a wire to the hopper, through the hopper, past the now exposed port 257, and into the carrier.

Sometimes it is desired not to fill all bores in the carrier to make a tube stem with less than all of the lead wires at the wire positions. In that case, one or more hoppers at the wire feed stations would not be supplied with wires and the checker at the corresponding bore in the carrier would be rendered inoperative as by placing an insulating chock in between an arm 240 and the ring 248, the chock being of sufficient thickness to maintain stop arm 238 in non blocking position relative to runway 234.

After the carrier has been filled with an appropriate number of lead wires, it is indexed to the transfer station, indicated generally as 308, whereat the carrier 28 is swung beneath a transfer device, wires are withdrawn from the carrier and then thrust down into a peg 310 on a stem molding machine. See Figs. 1A, 2A, and Figs. 12 to 17. In general, there is provided at the transfer station a pair of superimposed relatively rotatable perforated discs 312, 314 which preliminarily thread down over the lead wires L and then rotate relatively to each other to temporarily properly position the wires, and a chuck 316 for axially moving the leads, removing them from the carrier and while still guided by the discs inserting the leads into a peg on the stem molding machine.

As the carrier chain is indexed to the transfer station, see Fig. 12, the arcuate key 44 previously described, enters an arcuate cleft head 318 stem supported for rotation in ball bearings in a frame secured bracket 320. Integral with this head is a crank arm 322, see to the left of Fig. 1A, connected by a link 324, to a lever 326 pivoted on the frame at 327 and having an upstanding cam follower 328 riding on a cam 330 fixed to the vertical shaft 64. A suitable spring 331, fastened to the lever and the frame, maintains the follower against the cam. The cam is so contoured that the cleft head 318 is operated to swing the carrier out from the chain after chain indexing operation and to swing the carrier back after wire withdrawal from the carrier and prior to the next chain indexing operation.

Figure 16:
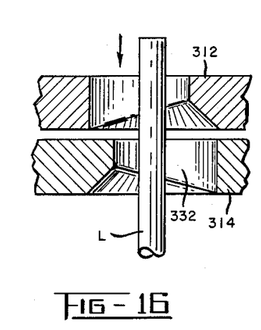
Fig. 16 is a section as viewed along the line 16—16 of Fig. 15 with a lead inserted and Fig. 17 is a similar section showing the apertures in a closed position about a lead.
Figure 17:
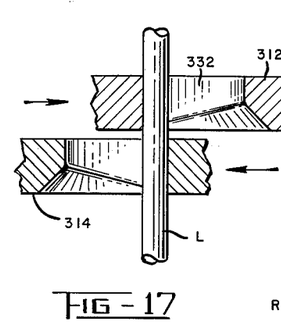

After the carrier has been swung out from the chain, see Figs. 14 to 17, the superimposed discs 312 and 314 are threaded over the lead wires L. Each disc is provided with a number of vertical bores 332 corresponding in number to the number of bores in the carrier. The lower disc 314, in the plane of the disc, has its bores narrowing to the right while the reverse is true with respect to the upper disc. The entrances to the bores from beneath are flared. When the discs are to be threaded over the wires they are orientated as seen in Fig. 16 so that relatively large areas of the bores are superimposed. This permits the wires, which are relatively loose in the carrier bores and which may lean slightly relative to the vertical, to freely enter the bores in the discs. However rotation of the discs relative to each other in the directions of the arrows in Figs. 15 and 17, will move the lead wires toward the smaller ends of the bores in both discs and force them to move to proper vertical positions. The discs are rotatively mounted in a plate 333 through the intermediary of ball bearings and are oscillated relative to each other by a pair of links 334, 336, pivoted to and driven by a cross bar 338 fastened by screws 340 to a slide bar 342. The link 334 is pivoted to a stud on disc 312 while the link 336 is pivoted to a stud on disc 314 which stud extends through an arcuate slot 344 in the upper disc. The rear end of the slide bar has a clevis 346 connected to an end of a plunger 348 whose head is the piston of an air motor 350. A spring 352 restores the piston to the position shown in Fig. 14. Air is admitted to the motor by a valve mechanism under the control of a cam (not shown) on shaft 70. Normally the spring 352 maintains the discs in the closed position shown in Fig. 17 but when a carrier has been brought under the discs, air admitted to the motor will shift the discs to the open position of Fig. 16. The discs having been threaded over the lead wires, as will be described, the air will be released from the cylinder of motor 350, and the wires will be vertically parallelly aligned. When so aligned the pressure applied to the discs by the spring 352 is light enough to permit longitudinal sliding motion of the wires through the closed discs. The plate 333 supports the motor and other just described parts as well as the discs and has integrally attached thereto a ribbed angled bracket 354 which has a sleeve 356, see Fig. 2A, slidable on guide posts 358, 360, which posts are fixed relative to the frame of the machine. Means to vertically reciprocate the sleeve 356 is provided in the form of a link 362 pivoted to the sleeve and to a lever 364 pivoted on a bracket 365 affixed to the standard 74, the lever in turn being connected to a link 366 extending down and pivoted to a lever 368, Fig. 1A, pivoted at its end 370 to the upper corner 371 of a plate 372 web connected to standard 74 and extending upwardly from the extension 76. The lever 368, intermediate its ends, has a cam follower 374 riding on a side cam groove 376 in a cam disc 378 fast on shaft 70. The cam groove is contoured to give a desired rise and fall motion to the plate 33 as will be described.

Above the discs is the chuck 316, see Fig. 12, with means to grasp the lead wires, said chuck being movable to longitudinally move the wires as will be described. The chuck is provided with three-armed clamp jaws 380 corresponding in number and position to the bores in carrier 28. The lead wire engaging fingers 382 of the jaws are normally spring pressed toward a core 384, screwed into the chuck, by springs 386 operative against tails 388 on the jaws, adjustable stops 390 being provided to limit jaw movement. Jaw release arms 392 lie beneath a piston 394 above which is a fluid chamber 396 supplied with compressed air through the intermediary of a conduit 398 leading to a valve, not shown, controlled by a cam on shaft 70, as will be readily understood. The chuck is vertically shifted by an arm 400, Fig. 2A, whose upper end terminates in a sleeve 402 slidable on guide post 360 and a third guide post 404. The sleeve is reciprocated on the posts 404 and 360 by mechanism comprising a link 406 pivoted to the sleeve and to a lever 408 pivoted on bracket 365 and coaxial with lever 364, and a link 410 pivoted to the lever 408 and to a lever 412. The lever 412 intermediate its ends has a cam follower 413 riding in a side groove in a cam disc 414 in similar fashion to the arrangement of cam follower 374 of lever 368 in its cam disc 378. The pivoted end 415 of the lever 412 is on a corner 416 of plate 372 opposite to corner 371. By the mechanism just described the chuck and the discs can reciprocate vertically independently of each other.

After the carrier 28 has been swung to the position shown in Figs. 2A and 12, the arm 354 is brought down enough to cause the wires L to thread through the now open discs 312 and 314. At this time the fingers 382 are maintained open. Next the discs are operated to close on the wires to align them as the arm 400 is brought down to cause the wires to come into proper position against the core 384. Now the pressure is released from above piston 394 and the springs 386 force the fingers 382 to close on the wires. Next the discs release the wires, and cams previously described cause the arm 354 to move up slightly, but the arm 400 is moved up sufficiently to pull the wires completely out of and above the carrier 28. The carrier is swung out from above the peg 310 and against the chain leaving an unobstructed path for the insertion of the wires into the peg. The cams then move both the arms 354 and 400 downwardly with the wires threaded through the discs, the arm 354 moving until the plate 333 is quite close to the peg and the arm 400 moving until the head is close to the disc 312. During the downward movement of the two arms the discs 312, 314 again spring close on the wires but they can be thrust through the discs by action of the head 316. As the head approaches the lower limit of its motion, air is again admitted to the chamber 396 and the wires are released; the discs 312 and 314 are also opened.

Subsequently both the arms 354 and 400 are raised to allow another wire loaded carrier arm to swing beneath the discs. The turret carrying the pegs 310 is also indexed to present a new peg 310 beneath a swung out carrier.

What is claimed is:

1. A wire feed mechanism comprising a drive shaft, a conveyor with spaced carriers thereon, means coupling the drive shaft and conveyor to impart indexing motion to the conveyor, a constantly driven shaft driven by said drive shaft, a cam on said driven shaft, an oscillatable shaft, a drive arm fast on said oscillatable shaft and cooperting with said cam to cause oscillating motion of said last named shaft, a wire feed hopper above the carriers, and means controlled by the motion of the oscillatory shaft to feed a wire from said hopper to a carrier, when the same has been indexed to a position directly beneath the hopper, comprising a dispensing wheel having lead wire retaining slots in its periphery with said periphery penetrating the interior of the hopper, a ratchet fast with the dispensing wheel, a mechanism having a pawl engageable with the ratchet to move the same, a driven arm fixed on the oscillatable shaft and connected to the pawl to oscillate the same about the axis of the ratchet, said cam being contoured to impart several oscillatory motions to the pawl and wheel without advancing the wheel and to jiggle the wires in the hopper to cause one of them to enter a slot and further contoured to impart a large step movement to the pawl to cause the ratchet to be advanced one step to a position from which a wire would be fed to the underlying carrier.

2. A wire feed mechanism comprising a drive shaft, a conveyor with spaced carriers thereon, means coupling the drive shaft and conveyor to impart indexing motion to the conveyor, a constantly driven shaft driven by said drive shaft, a cam on said driven shaft, an oscillatable shaft, a driven arm fast on said oscillatable shaft and cooperating with said cam to cause oscillating motion of said shaft, a wire feed hopper above the carriers, and means controlled by the motion of the oscillatory shaft to feed a wire from said hopper to a carrier, when the same has been indexed to a position directly beneath the hopper, said hopper having a reciprocatable bottom with a projection extending therefrom, and another dirven arm fast on the oscillatable shaft to engage said projection and reciprocate the bottom on each oscillation of the shaft and said wire feeding means comprising a dispensing wheel having lead wire retaining slots in its periphery with the periphery penetrating the interior of the hopper, a ratchet fast with the dispensing wheel, a mechanism having a pawl engageable with the ratchet to move the same, a driven arm fixed on the oscillatable shaft and connected to the pawl to oscillate the same about the axis of the ratchet, said cam being contoured to impart several oscillatory motions to the pawl and wheel without advancing the wheel and to jiggle the wires in the hopper to cause one of them to enter a slot and further contoured to impart a large step movement to the pawl to cause the ratchet to be advanced one step to a position from which a wire would be fed to the underlying carrier.

3. A lead wire feeding mechanism comprising a hopper for retaining therein a number of wires in juxtaposed horizontal positions, a chute, a dispensing mechanism for removing wires from the hopper one at a time and releasing them for passage through the chute, the chute having one vertical wall out of the path of the falling wire and a second sloping wall intercepting the wire toward one end thereof to cause the wire to fall down the chute always in one direction of orientation of the wire, the chute tapering to a small opening at the bottom, a collar beneath the chute, a chute mouthpiece in the collar mounted to rotate in a horizontal plane, a wire receiver with multiple bores beneath the collar, a vertical passageway through the mouthpiece, adjustable by mouthpiece rotation over any of the bores in the receiver, the bottom of the chute riding in the passageway of the mouthpiece, and the upper portion of the chute being pivoted to allow for swing of the chute during mouthpiece adjustment.

4. A wire feed mechanism comprising an indexible conveyor, a number of carriers spaced along the conveyor, each carrier including a cylinder with vertical wire receiving bores therein, means stationed along the path of travel of the cylinders for feeding wires into the bores of the cylinders, a further wire feeding device, said further feeding device including a means to sense the absence of a wire in a bore of the cylinder and also including a means, controlled by the sensing means, to feed a wire into said bore, said further device being stationed along the path of travel of the cylinders beyond the wire feeding means, and drive means forming part of the wire feed mechanism to index the conveyor, operate the wire feeding means and further wire feeding device.

5. A wire feed mechanism comprising an indexible conveyor, a number of carriers spaced along the conveyor, each carrier including a cylinder with vertical wire receiving bores therein, means stationed along the path of travel of the cylinders for feeding wires into the bores of the cylinders, a further wire feeding device, said further wire feeding device including a vertically reciprocatable head, a chute rotatable in said head and mounted for vertical movement with said head, said chute having a dispensing mouth eccentric of the axis of rotation of the chute and positionable over any bore in the cylinder, means to rotate the chute, and means to arrest rotation of the chute comprising a rigid projection on the chute and a wire checker mounted on said head, said checker having a stop arm movable out of the path of movement of the projection when a wire is present in the cylinder in a cylinder bore beneath the wire checker, said checker further including a wire checker finger rigid with said arm and moving said arm out of the path of the projection on downward descent of the head and engagement of the finger with a wire in said bore of the cylinder, said further wire feeding device being stationed along the path of movement of the cylinders beyond the wire feeding means, and drive means forming part of the wire feed mechanism for indexing the conveyor, operating the wire feeding means and the further wire feeding device.

6. A wire feed mechanism comprising an indexible conveyor, a number of carriers spaced along the conveyor, each carrier including a cylinder with vertical wire receiving bores therein, means stationed along the path of travel of the cylinders for feeding wires into the bores of the cylinders, a further wire feeding device, said further wire feeding device including a vertically reciprocatable head, a chute rotatable in said head and mounted for vertical movement with said head, said chute having a dispensing mouth eccentric of the axis of rotation of the chute and positionable over any bore in the cylinder, a gear rigid with and surrounding the upper portion of the chute, a horizontal segment meshing with the gear to drive the same, a vertical shaft with a bearing at the upper end for pivotally mounting the segment, a spring interconnecting the shaft and segment, means for oscillating the shaft, and means to arrest rotation of the chute comprising a rigid projection on the chute and a wire checker mounted on said head, said checker having a stop arm movable out of the path of the projection when a wire is present in the cylinder in a cylinder bore beneath the checker, said checker further including a wire checker finger rigid with said arm and moving said arm out of the path of the projection on downward descent of the head and engagement of the finger with a wire in said bore of the cylinder, said further wire feeding device being stationed along the path of movement of the cylinders beyond the wire feeding means, and drive means forming part of the wire feed mechanism for indexing the conveyor, operating the wire feeding means, the vertically reciprocable head of the further wire feeding device and the said vertical shaft.

7. A wire feed mechanism comprising an indexible conveyor, a number of carriers spaced along the conveyor, each carrier including a cylinder with vertical wire receiving bores therein, means stationed along the path of travel of the cylinders for feeding wires into the bores of the cylinders, a further wire feeding device, said further wire feeding device including a vertically reciprocatable head, a chute rotatable in said head and mounted for vertical movement with said head, said chute having a dispensing mouth eccentric of the axis of rotation of the chute and positionable over any bore in the cylinder, a gear rigid with and surrounding the upper portion of the chute, a horizontal segment meshing with the gear to drive the same, a vertical shaft with a bearing at the upper end for pivotally mounting the segment, a spring interconnecting the shaft and segment, means for oscillating the shaft, and means to arrest rotation of the chute comprising a rigid projection on the chute and a wire checker mounted on said head, said checker having a stop arm movable out of the path of the projection when a wire is present in the cylinder in a cylinder bore beneath the checker, said checker further including a wire checker finger rigid with said arm, moving said arm out of the path of the projection on downward descent of the head and engagement of the finger with a wire in said bore of the cylinder, and a contact arm rigid with the stop arm and checker finger normally in engagement with a contact on said head and means under control of said contact for feeding a wire into said chute, said further wire feeding device being stationed along the path of movement of the cylinders beyond the wire feeding means, and drive means forming part of the wire feed mechanism for indexing the conveyor, operating the wire feeding means, the vertically reciprocable head of the further wire feeding device and the said vertical shaft.

8. A wire feed mechanism comprising a conveyor, spaced carriers pivotally mounted on said conveyor and having wire carrying bores, means along the path of movement of the carriers to load said bores with wires while said carriers are in a swung position close to the conveyor, a machine alongside of the wire feed mechanism having spaced receiving elements, means for synchronously indexing the mechanism and machine to bring a carrier opposite a receiving element, means to swing said opposite carrier over the receiver and back again, means above the carrier acting while the carrier is swung in registration with the receiver to extract the wires from the carrier, and, when the carrier is swung back out of registration with the receiver, to insert the wires into the underlying receiver, and a drive shaft for driving the means which synchronously indexes the mechanism and machine, which swings the carriers and which operates the wire extracting and inserting means.

9. A wire feed mechanism comprising a conveyor, spaced carriers pivotally mounted on the conveyor and having wire receiving bores, means along the path of movement of the carriers to load said bores with wires while said carriers are in a swung position close to the conveyor, a machine alongside of the feed mechanism having spaced receiving elements, means for simultaneously indexing said mechanism and machine to bring respective pairs of receiving elements and carriers close to each other, means to swing a carrier when close to a receiver away from the conveyor and over the receiver and subsequently back again, aligning means above the swung away position of the carrier and normally above the wires therein, means to operate said aligning means to thread down over said wires and to align them, and a vertically reciprocative chuck above said aligning means to engage said aligned wires and withdrawn the same from the carrier and to thrust the wires into the receiver after the carrier has been swung out from under the chuck, and a drive shaft having means coupled therewith to operate the bore loading means, the means for simultaneously indexing the mechanism and machine, the means for swinging of the carrier, the means to operate the aligning means and the chuck.

10. A wire feed mechanism comprising a conveyor, spaced carriers pivotally mounted on the conveyor and having wire receiving bores, means along the path of movement of the carriers to load said bores with wires while said carriers are in a swung position close to the conveyor, a machine alongside of the feed mechanism having spaced receiving elements, means for simultaneously indexing said mechanism and said machine to bring respective pairs of receiving elements and carriers close to each other, means to swing a carrier when close to a receiver away from the conveyor and over the associated receiver and subsequently back again, a pair of relatively rotatable discs above the swung away position of the carrier and normally above the wires in the carrier, said discs having bores whose cross sections are tapered in opposite directions, means to vertically reciprocate said discs to thread down onto and up away from the wires, means to rotate the discs to bring the wires into the small parts of the bores when the discs are threaded over the wires, a vertically reciprocatable chuck above the discs, the vertical upward reciprocation of the discs and chuck withdrawing the wires from the carrier, said chuck being operative to thrust the wires through the discs and into the receiver after the carrier has been swung out from under the discs, means to vertically reciprocate the chuck, means to operate the discs to release their confinement of the wires, after they have entered the receiver, said discs moving above the wires after loading of the receiver has been accomplished and a common drive for all of the previously referred to means.

11. A wire transfer mechanism for transferring to a receiver wires which have been stored loosely in bores in a carrier, said mechanism comprising said carrier and said receiver and a support, said carrier being pivotally mounted on said support and means for pivoting said carrier, means for loading said carrier with wires while swung close to its support, said pivoting means bringing the loaded carrier over the receiver, a wire aligning means comprising a pair of relatively rotatable discs above the receiver, said discs having bores therein which in cross section taper in the direction of rotative movement of the discs, the smaller portions of the bores of the two discs registering with each other in one rotative position of the discs and the larger portions of the bores of the two discs registering with each other in another rotative position of the discs, means to thread the discs over the wires in the latter position of the discs, means to shift the discs when so threaded over the wires to the first position of the discs, a vertically reciprocatable chuck above the discs, means to vertically reciprocate the chuck, means on the chuck to engage the wires to withdraw the same from the carrier on upward movement of the chuck, means for moving the discs upwardly while the chuck is so moving in order that the wires may be retained in alignment by both the chuck and discs, the chuck and discs moving downwardly to feed the wires into the receiver after carrier movement out from beneath the discs, means to shift the discs to fully disengage from the wires and move the discs and chuck upward, after the wires had been fed into the receiver, and a common drive for all of the previously referred to means.

12. A wire transfer device comprising a translatable cylinder with vertical bores therein to loosely retain wires, a device thereabove to engage the wires close to the upper ends thereof and to align them, a chuck thereabove to engage the upper ends of the wires, means to operate the device and chuck to withdraw the wires from the cylinder while maintaining the wires in alignment, means to translate the cylinder to a position clear of the downward movement of the wires, a receiver with wire receiving holes therein, means for moving the aligning device and chuck downward to deposit the wires in the holes of the receiver and to subsequently move the device and chuck upwardly to clear the upper ends of the wires, and a common drive for all of the previous means.

13. A wire feed mechanism comprising an indexible support with means to index the same, a carrier pivotally mounted on the support and having wire carrying bores, means to load the carrier at indexed positions of the support with wires while it is in a swung position close to the support, a second support alongside of the wire feed mechanism having a wire receiving mechanism, means to swing the carrier over the receiver into registration therewith and back again, means above the carrier acting while the carrier is swung into registration with said receiver to extract the wires from the carrier, and when the carrier is swung out of registration with the receiver, to insert the wires into the underlying receiver, and a common drive for all of said means.

14. A wire feed mechanism comprising a first indexible support and means to index the support, a carrier, having bores, pivotally mounted on said support, means to load the bores in the carrier with wires at indexed positions of the support while the carrier is swung close to the first support, a second support alongside of the first support having a receiving element with bores corresponding to the bores in the carrier, means to swing the carrier from its position close to the first support to a position wherein the bores in the carrier register with the corresponding bores in the receiving element, and to swing the carrier back again toward the first support, aligning mechanism above the swung away position of the carrier and normally above the wires therein, means to operate said aligning mechanism to thread down over said wires and to align them, and a vertically reciprocative chuck above said aligning mechanism to engage said aligned wires and withdraw the same from the carrier and to thrust the wires into the receiving element after the carrier has been swung out from under the chuck, means to vertically reciprocate the chuck and a common drive for all of said means.

15. A wire feed mechanism comprising a conveyor, means to index the conveyor, a number of carriers spaced along the conveyor, each carrier including a cylinder with vertical wire receiving bores therein, means stationed along the path of travel of the cylinders for feeding wires into the bores of the cylinders, a further wire feeding device farther along in the path of travel of said cylinders, said further feeding device including elements to sense the absence of a wire in a bore of the cylinder and also including devices operative in response to the sensing elements to feed a wire into said bore, means for operating the further wire feeding device, a receiver alongside of the conveyor having bores corresponding in number and spacing to the bores in the cylinders, said receiver being located beyond the further feeding device, means to transfer the entire group of wires in the bores of a cylinder, as a unit, into the bores of the receiver, said transfer means having elements to maintain the wires in parallelism and in proper spaced relationship during transfer of the wires, and a common drive for all of said means.

16. A wire feed mechanism comprising a conveyor, means to index the conveyor, a number of carriers spaced along the conveyor, each carrier including a cylinder with vertical wire receiving bores therein, means stationed along the path of travel of the cylinders for feeding wires into the bores of the cylinders, a further wire feeding device farther along in the path of travel of said cylinders, said further feeding device including elements to sense the absence of a wire in a bore of the cylinder and also including devices operative in response to the sensing elements to feed a wire into said bore, means for operating the further wire feeding device, a receiver alongside of the conveyor having bores corresponding in number and spacing to the bores in the cylinders, said receiver being located beyond the further feeding device, means to transfer the entire group of wires in the bores of a cylinder, as a unit, into the bores of the receiver, and a common drive for all of said means.

References Cited in the file of this patent

UNITED STATES PATENTS

| | | |
|---|---|---|
| 141,922 | Dayton | Aug. 19, 1873 |
| 682,243 | Cuscaden | Sept. 10, 1901 |
| 977,441 | Fleming et al. | Dec. 6, 1910 |
| 1,630,949 | Kelly | May 31, 1927 |
| 1,680,024 | Koerner | Aug. 7, 1928 |
| 1,688,369 | Willard | Oct. 23, 1928 |
| 1,821,894 | Otaka | Sept. 1, 1931 |
| 1,920,605 | Steward | Aug. 1, 1933 |
| 2,031,713 | Johnson | Feb. 25, 1936 |
| 2,216,276 | Mann et al. | Oct. 1, 1940 |
| 2,332,026 | Suppiger | Oct. 19, 1943 |
| 2,554,982 | Hartley et al. | May 29, 1951 |
| 2,646,897 | Francisco | July 28, 1953 |
| 2,655,954 | Gartner et al. | Oct. 20, 1953 |
| 2,683,538 | Kingston et al. | July 13, 1954 |
| 2,698,987 | McGowan | Jan. 11, 1955 |
| 2,760,254 | Wolke et al. | Aug. 28, 1956 |
| 2,763,963 | May et al. | Sept. 25, 1956 |

FOREIGN PATENTS

| | | |
|---|---|---|
| 16,282 | Great Britain | of 1914 |
| 363,117 | Germany | Nov. 4, 1922 |
| 498,846 | Canada | Dec. 29, 1953 |